US011779004B2

(12) United States Patent
Duncan et al.

(10) Patent No.: US 11,779,004 B2
(45) Date of Patent: Oct. 10, 2023

(54) SELF-MOVING DEVICE, CHARGING STATION, AUTOMATIC WORKING SYSTEM, AND INSECT SUPPRESSION DEVICE THEREOF

(71) Applicant: Positec Power Tools (Suzhou) Co., Ltd, Suzhou (CN)

(72) Inventors: Thomas Ellis Duncan, Charlotte, NC (US); An Ge, Suzhou (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 745 days.

(21) Appl. No.: 16/859,193

(22) Filed: Apr. 27, 2020

(65) Prior Publication Data

US 2020/0323191 A1    Oct. 15, 2020

Related U.S. Application Data

(63) Continuation of application No. PCT/CN2018/112499, filed on Oct. 29, 2018.

(30) Foreign Application Priority Data

Oct. 27, 2017   (CN) .......................... 201711022031.7

(51) Int. Cl.
*A01M 5/04* (2006.01)
*A01D 34/00* (2006.01)
(Continued)

(52) U.S. Cl.
CPC ............. *A01M 5/04* (2013.01); *A01D 34/008* (2013.01); *G05D 1/0088* (2013.01);
(Continued)

(58) Field of Classification Search
CPC ........ A01M 5/04; A01M 5/08; A01M 7/0014; A01M 7/0025; A01M 29/10; A01M 29/12;
(Continued)

(56) References Cited

U.S. PATENT DOCUMENTS 3,886,492 A * 5/1975 White .................... A01M 29/18
43/132.1
10,638,743 B1 * 5/2020 Shapiro ................. H01M 10/48
(Continued)

FOREIGN PATENT DOCUMENTS

CA         2388870 A1 * 5/2001 ........... G05D 1/0221
CN       103809592 A      5/2014
(Continued)

*Primary Examiner* — Rodney A Butler
(74) *Attorney, Agent, or Firm* — Dentons US LLP

(57) ABSTRACT

An insect suppression device, and further relates to a self-moving device, a charging station, and an automatic working system that are mounted with the insect suppression device are provided. The self-moving device moves in a working area, performs a working task, and includes: a body and a movement module that is mounted on the body and drives the self-moving device to move. The self-moving device includes: an insect suppression device, mounted to the body, and a control module, controlling the movement module to move and controlling the insect suppression device to work. The beneficial effects of the present invention are as follows: The self-moving device can move autonomously in the working area and perform an insect suppression task, and has a wide coverage area, flexible work, and high efficiency, so that automatic control can be implemented, thereby freeing a user from the harassment of insects.

18 Claims, 9 Drawing Sheets

(51) Int. Cl.
| | |
|---|---|
| *G05D 1/00* | (2006.01) |
| *G05D 1/02* | (2020.01) |
| *G06Q 10/06* | (2023.01) |
| *G06Q 10/0631* | (2023.01) |
| *A01M 5/08* | (2006.01) |
| *A01M 7/00* | (2006.01) |
| *A01M 29/10* | (2011.01) |
| *A01M 29/12* | (2011.01) |
| *A01M 29/28* | (2011.01) |

(52) U.S. Cl.
CPC ......... *G05D 1/0094* (2013.01); *G05D 1/0225* (2013.01); *G06Q 10/063116* (2013.01); *A01M 5/08* (2013.01); *A01M 7/0014* (2013.01); *A01M 7/0025* (2013.01); *A01M 29/10* (2013.01); *A01M 29/12* (2013.01); *A01M 29/28* (2013.01); *G05D 2201/0208* (2013.01)

(58) Field of Classification Search
CPC ........ A01M 29/28; A01M 1/023; A01M 1/04; A01M 1/06; A01M 1/08; A01M 1/2027; A01M 1/2061; A01M 1/2077; A01M 1/223; A01M 29/18; A01D 34/008; A01D 43/00; G05D 1/0088; G05D 1/0094; G05D 1/0225; G05D 2201/0208; G05D 1/0274; G05D 1/0278; G06Q 10/063116; G06Q 10/06315; G06Q 50/02

See application file for complete search history.

(56) References Cited

U.S. PATENT DOCUMENTS

| | | | |
|---|---|---|---|
| 2008/0034643 | A1* | 2/2008 | Chen ....................... A01M 1/04 43/112 |
| 2009/0183478 | A1 | 7/2009 | Bernini |
| 2016/0377093 | A1* | 12/2016 | Shigemoto ......... B01D 46/0038 415/121.2 |
| 2017/0364091 | A1* | 12/2017 | Bennett .................... A47L 7/00 |

FOREIGN PATENT DOCUMENTS

| | | | | |
|---|---|---|---|---|
| CN | 105123662 | A | | 12/2015 |
| CN | 105501321 | A | | 4/2016 |
| CN | 106131221 | A | | 11/2016 |
| DE | 102013016909 | A1 | * | 4/2015 ............ A01M 3/025 |
| EP | 3222391 | A1 | | 9/2017 |
| EP | 3489784 | A1 | | 5/2019 |

* cited by examiner

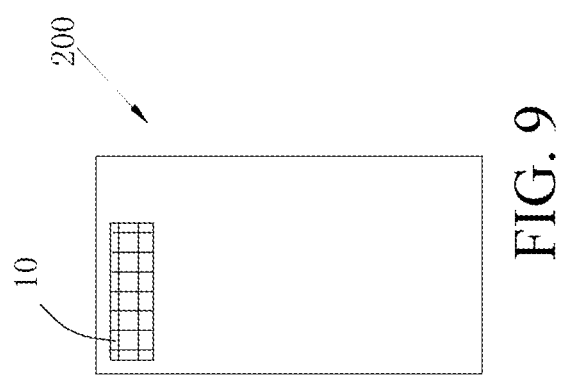

SELF-MOVING DEVICE, CHARGING STATION, AUTOMATIC WORKING SYSTEM, AND INSECT SUPPRESSION DEVICE THEREOF

This application is a By-Pass continuation application of International Application PCT/CN2018/112499, filed on Oct. 29, 2018, which claims benefit of and priority to Chinese Patent Application No. 201711022031.7 filed on Oct. 27, 2017, which is hereby incorporated by reference in their entirety for all purposes as if fully set forth herein.

TECHNICAL FIELD

The present invention relates to an insect suppression device, and further relates to a self-moving device, a charging station, and an automatic working system that are mounted with the insect suppression device.

RELATED ART

With the improvement of people's living standards, requirements of living quality become increasingly high. In daily life, one of the problems that bother people is the harassment of insects (including mosquitoes). In a typical scenario, a user organizes an activity on a lawn, for example, holds a party. Insects on the lawn are severely annoying. Especially in nighttime, people are harassed by insects and find it hardly probable to enjoy the activity.

Various types of devices such as an insect-killing swatter and an insect killing lamp are commercially available for repelling or killing insects. Such a device is usually fixed in a room or needs to be operated by a user and is less than adequate to free the user from the harassment of insects.

SUMMARY

To overcome the defects in the prior art, an embodiment of the present invention provides a self-moving device and a system thereof having an insect suppression function. The self-moving device can move autonomously in a working area and complete a working task, and therefore becomes increasingly popular among people. Common self-moving devices include an industrial handling robot, a household autonomous vacuum cleaner, an autonomous lawn mower, a street sweeper for a public area, and the like. The insect suppression function is integrated into the self-moving device, so that the self-moving device can perform an insect suppression task during autonomous movement, has a wide coverage area and a desirable effect, and is, for example, applied to an outdoor scenario or a large indoor scenario. The self-moving device can automatically perform work without the supervision of a user, thereby freeing the user from the harassment of insects.

An embodiment of the present invention provides a self-moving device, moving in a working area and performing a working task, wherein the self-moving device comprises: a body; a movement module, mounted on the body, and driving the self-moving device to move, wherein the self-moving device comprises: an insect suppression device, mounted to the body; and a control module, controlling the movement module to move, and controlling the insect suppression device to work.

In one embodiment, the insect suppression device is detachably connected to the body.

In one embodiment, the insect suppression device comprises at least one of an independent power supply, an independent controller, an independent switch or an independent indicator.

In one embodiment, the insect suppression device is arranged at the front or rear of the body.

In one embodiment, the insect suppression device is arranged at the top of the body.

In one embodiment, the insect suppression device is convex arranged on the body and is higher than the surrounding body.

In one embodiment, the insect suppression device is movable relative to the body, and the control module controls the insect suppression device to switch between a first state and a second state relative to the body.

In one embodiment, the insect suppression device is in a working state and a non-working state respectively in the first state and the second state, and when switching from the first state to the second state, the insect suppression device retracts inward relative to the body.

In one embodiment, the control module controls a working angle of the insect suppression device by controlling the insect suppression device to switch between the first state and the second state.

In one embodiment, the insect suppression device comprises an insect repelling device or an insect killing device.

In one embodiment, the insect suppression device comprises a device that can release an insect suppression substance.

In one embodiment, the insect suppression device comprises an ultrasound generation module.

In one embodiment, the insect suppression device comprises an insect trap module and an insect killing module, and the insect trap module and the insect killing module are integrated or the insect trap module and the insect killing module are separately disposed.

In one embodiment, the insect suppression device comprises a light-emitting device, a heating device, a fan or an electric net.

In one embodiment, when the control module controls the insect suppression device to work, it controls the self-moving device to move in a preset area or along a preset path.

In one embodiment, the control module obtains a preset signal, and controls, according to the preset signal, the insect suppression device to work and/or stop working.

In one embodiment, the self-moving device comprises a wireless communications unit, wherein the control module obtains the preset signal by the wireless communications unit.

In one embodiment, the preset signal is triggered by an operation of a user.

In one embodiment, wherein the control module comprises a storage unit that stores a preset program, and the preset program comprises: an insect suppression work program, comprising: providing an instruction signal to turn on the insect suppression device or turn off the insect suppression device, the control module executes the preset program, and the preset signal comprises the instruction signal.

In one embodiment, the insect suppression work program comprises: a work schedule, comprising a work start time or a work end time; providing, according to the work start time, the instruction signal to turn on the insect suppression device, or providing, according to the work end time, the instruction signal to turn off the insect suppression device.

In one embodiment, the preset program further comprises: determining a current season, and arranging or adjusting the work schedule according to the current season.

In one embodiment, the preset program further comprises: obtaining weather information, and arranging or adjusting the work schedule according to the weather information.

In one embodiment, the work schedule comprises: determining whether the current time is nighttime, and starting the insect suppression device during nighttime.

In one embodiment, the work schedule comprises: determining whether there is a user activity in or near the working area, and starting the insect suppression device if there is a user activity in or near the working area.

In one embodiment, the insect suppression work program further comprises: detecting a preset trigger condition, and providing, based on the detected preset trigger condition, the instruction signal to turn on the insect suppression device or turn off the insect suppression device.

In one embodiment, the self-moving device comprises a trigger switch or a sensor, wherein the preset trigger condition comprises the trigger switch or the sensor being triggered.

In one embodiment, the preset program further comprises: obtaining information about a preset area or path; and providing an instruction signal to drive the movement module to move in the preset area or move along the preset path.

In one embodiment, the preset program comprises: receiving a user instruction, driving, based on the user instruction, the movement module to move to learn about a boundary of an area or a path, and storing the boundary of the area or the path to obtain the information about a preset area or path.

In one embodiment, the insect suppression device comprises at least two working strength levels, and the control module adjusts a working strength of the insect suppression device based on the preset signal.

In one embodiment, the self-moving device further comprises a main working module configured to perform a task different from that of the insect suppression device.

In one embodiment, the self-moving device comprises a self-moving yard device.

In one embodiment, the self-moving yard device comprises an autonomous lawn mower, and the autonomous lawn mower comprises a cutting module controlled by the control module to perform a mowing task.

An embodiment of the present invention further provides an automatic working system, comprising a self-moving device and a charging station, wherein the self-moving device moves in a working area and performs a working task, and comprises: a body; a movement module, mounted on the body, and driving the self-moving device to move; and a first control device, controlling the movement module to move; and the charging station is provided to dock the self-moving device and supply electric energy to the self-moving device, wherein the automatic working system comprises: an insect suppression device; and a control module, controlling the insect suppression device to work, and the control module comprises the first control device.

In one embodiment, the charging station comprises a second control device that controls the insect suppression device to work.

In one embodiment, the insect suppression device is mounted to the charging station.

In one embodiment, the self-moving device can establish a communications connection with the charging station, when the self-moving device establishes the communications connection with the charging station, the first control device controls the insect suppression device to work, and the communications connection comprises a wireless connection or a wired connection.

An embodiment of the present invention further a charging station, provided to dock a self-moving device, and supplying electric energy to the self-moving device, wherein the charging station comprises an insect suppression device.

In one embodiment, the insect suppression device is detachably connected to the charging station.

An embodiment of the present invention further an insect suppression device, applied to an automatic working system, wherein the automatic working system comprises: a self-moving device, moving in a working area and performing a working task; or a charging station, provided to dock the self-moving device and supplying electric energy to the self-moving device, the insect suppression device is detachably connected to the self-moving device or the charging station.

Compared with the prior art, the beneficial effects of the present invention are as follows: The self-moving device can move autonomously in the working area and perform an insect suppression task, and has a wide coverage area, flexible work, and high efficiency, so that automatic control can be implemented, thereby freeing a user from the harassment of insects.

BRIEF DESCRIPTION OF THE DRAWINGS

The objectives, technical solutions, and beneficial effects of the present invention described above can be implemented through the following accompanying drawings:

FIG. 9 is a schematic diagram of a charging station according to an embodiment of the present invention.

DETAILED DESCRIPTION

Figure 1:
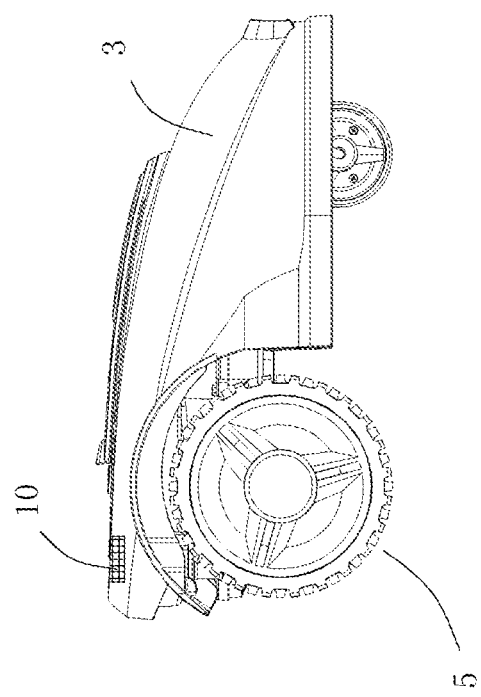
FIG. 1 is a schematic diagram of a self-moving device according to an embodiment of the present invention.

FIG. 1 is a schematic diagram of a self-moving device 1 according to an embodiment of the present invention. In this embodiment, the self-moving device 1 includes a body 3. The body 3 includes a base and an upper cover. The self-moving device 1 further includes a movement module 5 that is mounted on the body 3 and drives the self-moving device 1 to move. The movement module 5 includes a wheel set and is driven by a motor to drive the self-moving device 1 to move. The movement module 5 further includes a track disposed around the wheel set. The self-moving device 1 further includes an insect suppression device 10 mounted to the body 3. The self-moving device 1 further includes a control module (not shown). The control module controls the movement module 5 to move and controls the insect suppression device 10 to work. In this embodiment, the control module includes a plurality of control devices, a main control board that is mounted in a main cavity defined by the base and the upper cover, a driving control board of the motor, a controller of the insect suppression device 10, and the like. That is, different control devices may control the movement module 5 to move and control the insect suppression device 10 to work, so that the movement of the movement module 5 and the work of the insect suppression device 10 can be controlled independently. The self-moving device 1 further includes an energy module (not shown). The energy module supplies electric energy required for the self-moving device 1 to move and work. Specifically, the energy module includes a battery pack. The battery pack may be fixedly mounted in the body 3 or may be detachably connected to the body 3.

Figure 2:
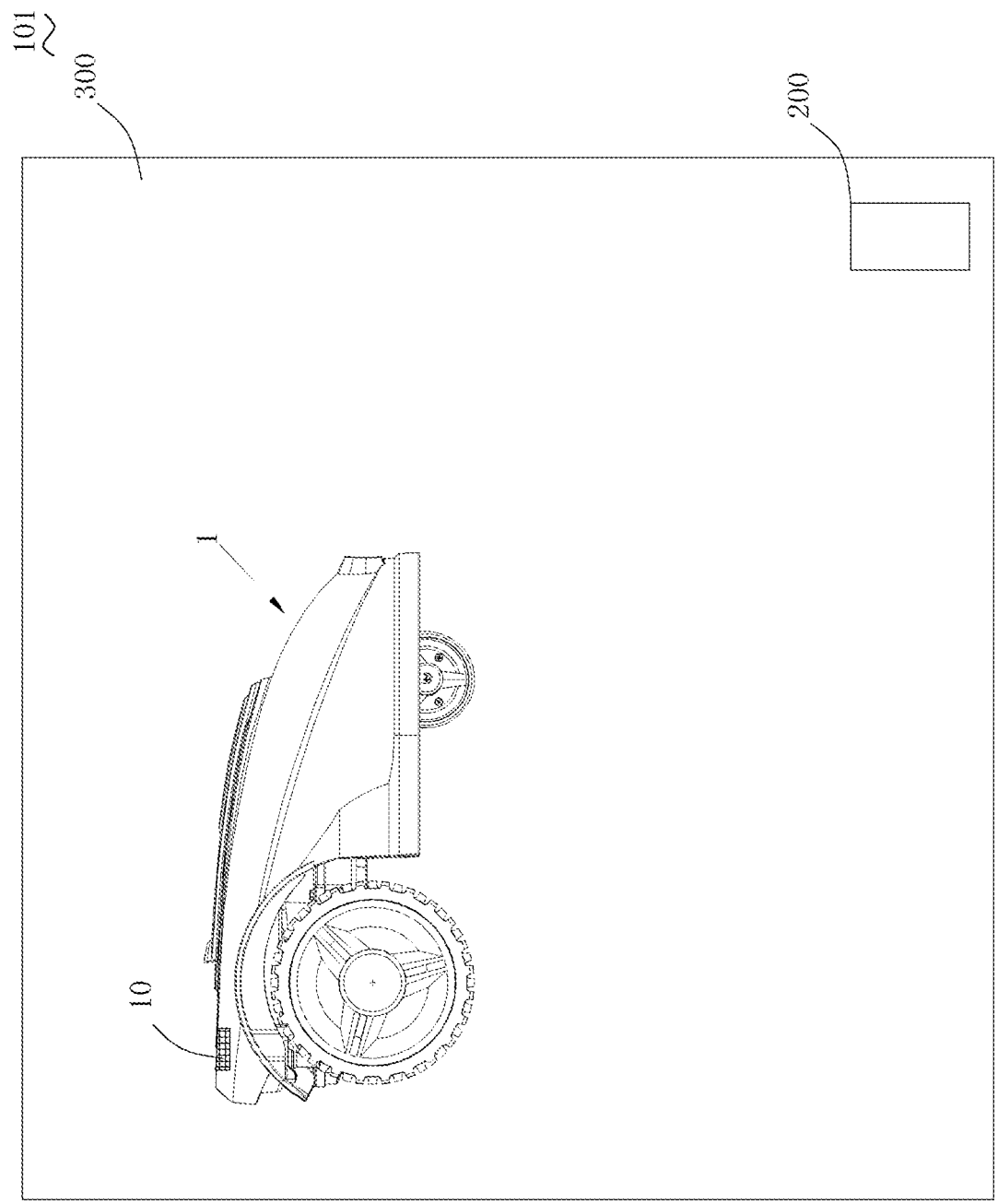
FIG. 2 is a schematic diagram of an automatic working system according to an embodiment of the present invention.

FIG. 2 is a system structure diagram of the self-moving device 1 shown in FIG. 1. An automatic working system 101 shown in FIG. 2 includes the self-moving device 1 and a charging station 200. The self-moving device 1 moves in a working area 300 defined by a boundary and performs a working task. The charging station 200 is provided to stop the self-moving device 1 and supply electric energy to the energy module of the self-moving device 1. The self-moving device 1 automatically returns to the charging station 200 for charging when a battery level of the self-moving device 1 is low.

Figure 3:
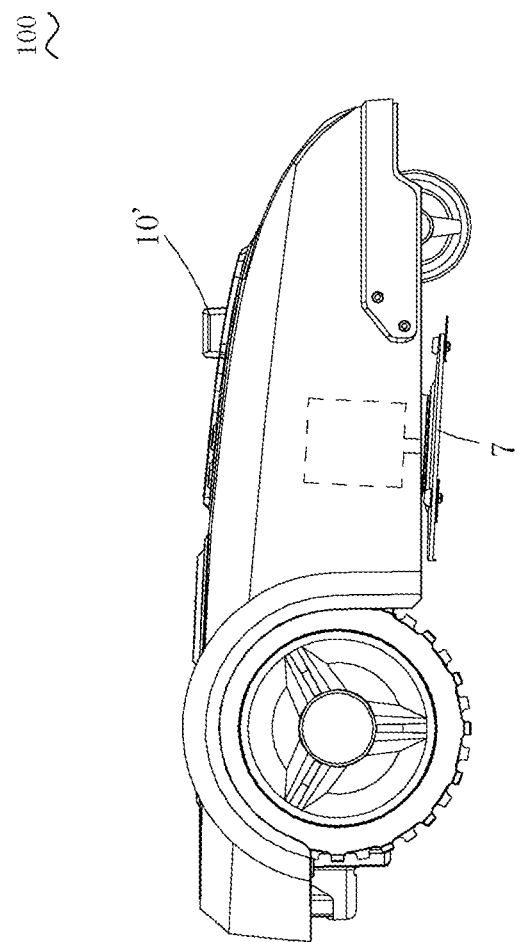
FIG. 3 is a schematic diagram of an autonomous lawn mower according to an embodiment of the present invention.

In this embodiment, the self-moving device 1 is specifically an autonomous lawn mower 100. As shown in FIG. 3, the autonomous lawn mower 100 includes a main working module 7 configured to perform a task different from that of an insect suppression device 10'. Specifically, the main working module 7 of the autonomous lawn mower 100 is a cutting module that is controlled by the control module to perform a mowing task. The self-moving device 1 may further be another device that does not need to be attended by a user, for example, an autonomous vacuum cleaner, an autonomous floor polisher, and an autonomous street sweeper. When the self-moving device is an autonomous vacuum cleaner, the main working module is a cleaning module. When the self-moving device is an autonomous floor polisher, the main working module is a polishing module. When the self-moving device is an autonomous street sweeper, the main working module is a sweeping module.

In this embodiment, the insect suppression device (10, 10') is configured to suppress insects including mosquitoes as well as mosquitoes, moths, flies, wasps, midges, ticks, ants, and the like. In this embodiment, the insect suppression device (10, 10') can avoid the harassment of insects in a working range, and includes an insect repelling device, an insect killing device, a device integrating insect repelling and insect killing or another device for reducing or disabling the biting of insects.

In one of the embodiments, the insect suppression device (10, 10') includes a device that can release an insect suppression substance. The insect suppression substance may be solid liquid or gas. For example, an insect repellent liquid may be sprayed. The insect suppression substance may be released by a physical or chemical manner such as heating or by using a structure such as a bump. The insect suppression substance includes an insect repellent or an insecticide. In an embodiment, the insect repellent may be specifically prepared from the following raw materials in parts by weight: 12 to 20 parts of *pelargonium,* 10 to 16 parts of mugwort leaf, 6 to 15 parts of *Poria cocos,* 8 to 15 parts of *Tripterygium wilfordii,* 4 to 9 parts of *Angelica dahurica,* 4 to 9 parts of *Celosia argentea,* 4 to 9 parts of *Lithospermum erythrorhizon,* and 8 to 12 parts of *Melia azedarach.* Certainly, the insect repellent may be prepared from other raw materials, provided that insect suppression is implemented. In an embodiment, the insecticide may be specifically prepared from the following components in percentage by weight: 4 to 8 percent of triptonide, 4 to 8 percent of anonaine, 2 to 4 percent of emulsifier, and the rest is the solvent. Certainly, the insecticide may be prepared from other raw materials, provided that insect killing is implemented.

In one of the embodiments, the insect suppression device (10, 10') includes an ultrasound generation module. The ultrasound generation module emits an ultrasonic wave with a frequency above 20000 Hz, so as to imitate a sound wave generated from the vibration of wings of predators such as dragonflies and bats of insects. Generally, the ultrasound generation module presets a fixed ultrasonic frequency.

In one of the embodiments, the insect suppression device (10, 10') includes a light-emitting device. Specifically, the light-emitting device may be an insect repellent lamp. The insect repellent lamp may emit yellow light to implement insect repelling. More precisely, the light emitted by the insect repellent lamp is concentrated in an insect-repelling frequency band of 530 nm to 590 nm, thereby implementing insect repelling.

In one of the embodiments, the insect suppression device (10, 10') is provided with a cavity. A fan is disposed in the cavity and can suck and dry insects, thereby implementing insect killing.

In one of the embodiments, the insect suppression device (10, 10') is provided with a cavity. A heating device is disposed in the cavity and may be specifically a positive temperature coefficient (PTC) heating element. An insect suppression substance such as an electric mosquito repellent element is further disposed in the cavity. The electric mosquito repellent element is an electric mosquito repellent mat or electric mosquito repellent liquid. The heating device converts the electric mosquito repellent mat or the electric mosquito repellent liquid into an insecticide gas to enter air, thereby implementing insect killing.

In one of the embodiments, the insect suppression device (10, 10') includes an insect killing electric net. A voltage of the insect killing electric net is set to be high enough to kill insects. The insect suppression device (10, 10') may further include an insect collection device. The insect collection device is configured to collect insects killed by the high voltage electric net and may be specifically a cavity or a cloth bag.

In one of the embodiments, the insect suppression device (10, 10') includes an insect trap module and an insect killing module. The insect trap module is configured to trick insects into the insect suppression device, and the insect killing module then kills the insects. The insect trap module includes an infrared heating device. The infrared heating device attracts insects into the insect killing module by keeping the heating temperature within a range of 37° C. to 40° C. The insect trap module further includes an insect trap lamp. The insect trap lamp can emit purple light that attracts insects, to trick the insects into the insect killing module.

The insect killing module includes the foregoing fan, electric net or the like. The insect trap module may be integrated with the insect killing module or may be separately disposed.

The self-moving device 1 in the foregoing embodiment is mounted with the insect suppression device (10, 10'), so that the self-moving device 1 can perform the insect suppression task while moving autonomously. Insect suppression has a wide coverage area, high efficiency, and flexible work, and requires no operation of a user, thereby freeing the user from the harassment of insects. The control module may control the insect suppression device (10, 10') to work while controlling the movement module 5 to move. That is, the self-moving device 1 performs insect suppression work while moving. Certainly, the control module may also control the insect suppression device (10, 10') to work when the self-moving device 1 does not move. That is, the self-moving device 1 may perform insect suppression work at a fixed point. For example, a user sets a plurality of key areas in which insects are crowded. The control module controls the self-moving device 1 to move to a specific position in these areas, and then controls the insect suppression device (10, 10') to perform work. Such a working mode can also implement multi-area mosquito repelling, only needs to be set once by a user, and does not require subsequent intervention, so that a wide coverage area, high efficiency, and flexible work are implemented, no operation of a user is required, and the like.

The autonomous lawn mower 100 in the foregoing embodiment has a function of automatically mowing a lawn, thereby freeing the user from the work of lawn maintenance. An insect suppression accessory is added to the autonomous lawn mower 100 to provide the autonomous lawn mower 100 with an insect suppression function, thereby extending the use of the autonomous lawn mower 100 and improving the living quality of the user. Certainly, the insect suppression device (10, 10') is added to another self-moving yard device, thereby extending the functions of the self-moving yard device.

The insect suppression device (10, 10') in this embodiment of the present invention may be an independent accessory, and is detachably connected to the body 3 of the self-moving device 1. Therefore, the insect suppression device (10, 10') may include an independent power supply, an independent controller, an independent switch or an independent indicator. The independent power supply supplies electric energy required for the insect suppression device (10, 10') to work. The independent controller controls the work of the insect suppression device (10, 10'). The independent switch triggers the insect suppression device (10, 10') to start or stop working. The independent indicator indicates a working state of the insect suppression device (10, 10'), and indicates to the user whether the insect suppression device (10, 10') is in the working state, whether an exception occurs or a capacity of the insect suppression substance.

Figure 4A:
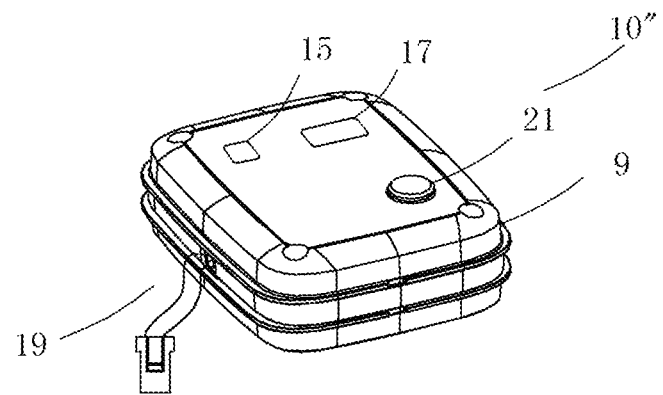
FIG. 4(a) is a three-dimensional view of an insect suppression device according to an embodiment of the present invention.
Figure 4B:
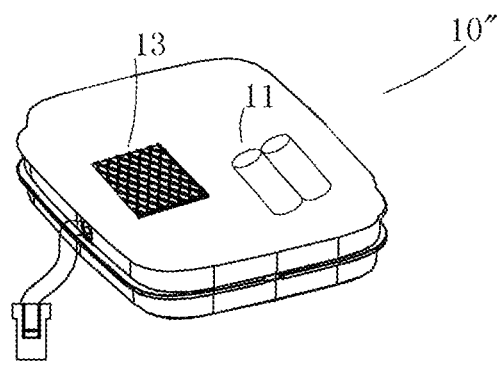
FIG. 4(b) is a sectional view of the insect suppression device in FIG. 4(a).
Figure 5:
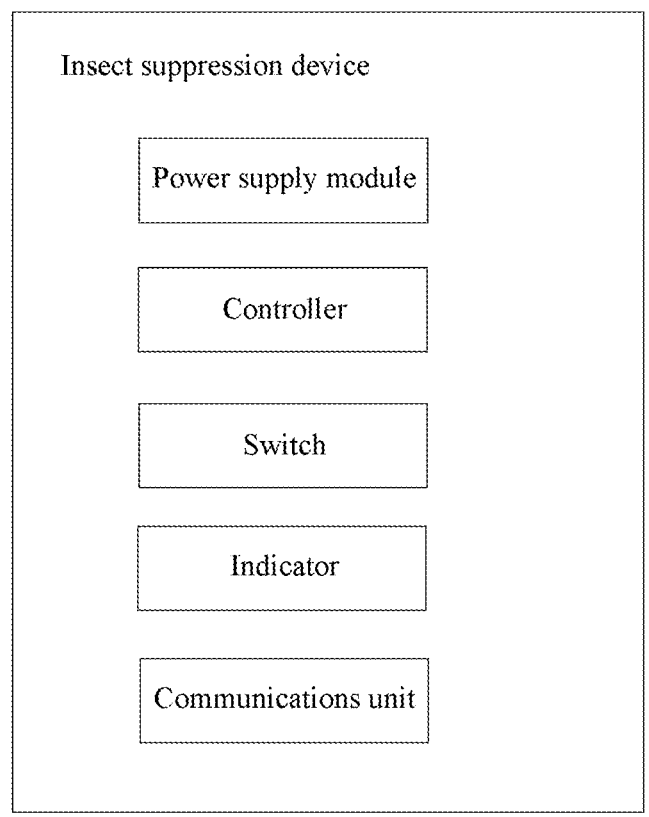
FIG. 5 is a modular diagram of the insect suppression device in FIG. 4(a).

FIG. 4(*a*) and FIG. 4(*b*) are schematic diagrams of an insect suppression device 10" according to an embodiment. As shown in FIG. 4(*a*) and FIG. 4(*b*), the insect suppression device 10" includes a housing 9 and has an independent appearance. With reference to a modular diagram of an insect suppression device 10" in FIG. 5, in this embodiment, the insect suppression device 10" includes a power supply module 11, a controller 13, a switch 15, and an indicator 17. The power supply module 11 includes a power supply interface for connecting to an external battery. For example, a dry cell may be mounted. The power supply module 11 may also include a built-in button cell. The insect suppression device 10" is a non-high frequency and non-high power component. Therefore, the button cell may last a long time and does not need to be frequently replaced. The switch 15 may be a mechanical switch such as a button or a knob or may be an electronic switch such as a touch switch or a voice control switch. The indicator 17 may be an indicator lamp. For example, a plurality of LED lamps are used for indicating different states or a display screen is used to display status information. In this embodiment, the insect suppression device 10" may further include a communications unit for communicating with the self-moving device 1 or an external device. The external device includes an intelligent terminal such as a mobile phone of the user. The communications unit includes a wired communications unit or a wireless communications unit. Specifically, the wireless communications unit includes a communications unit such as a Wi-Fi communications unit, a cellular communications unit, a Bluetooth communications unit or a Zigbee communications unit. The wired communication may be implemented by using an electric connection terminal by which the insect suppression device 10" is connected to the self-moving device 1 or the external device. The communication between the insect suppression device 10" and the self-moving device 1 or the external device includes receiving information including a control instruction sent by the self-moving device 1 or the external device, sending the status information to the self-moving device 1 or the external device or the like.

As shown in FIG. 4(*a*) and FIG. 4(*b*), in this embodiment, the insect suppression device 10" includes a docking interface 19 configured to dock with the body 3 of the self-moving device 1. The docking interface 19 includes a mechanical connection interface. Specifically, the insect suppression device 10" includes a structure matching the body of the self-moving device in shape, to enable the insect suppression device to be mounted to the body 3 of the self-moving device 1. The mechanical connection interface may further include a slide rail or a buckle structure. The docking interface 19 may further include an electric connection interface. Specifically, the electric connection interface includes a power terminal and/or a communications terminal, to implement an electric connection and/or a communications connection with the main control board of the self-moving device 1. The electric connection interface may be in the form of a connector to facilitate plugging and unplugging. In this embodiment, the docking interface 19 of the insect suppression device 10" can be docked with a corresponding docking interface on the body 3 of the self-moving device 1, so that the insect suppression device 10" can be mounted or disassembled quickly and operations of the user are facilitated. In an embodiment, the insect suppression device 10" can be mounted or disassembled without a tool. In another embodiment, the insect suppression device 10" is mounted to the body 3 of the self-moving device 1 by a fastener such as a bolt.

In this embodiment, the insect suppression device 10" includes a nozzle 21 configured to spray the insect suppression substance held in the insect suppression device.

The insect suppression device 10" in this embodiment is detachably connected to the self-moving device 1. As a product accessory, the insect suppression device 10" may be selected by the user as required for customization or may be purchased after the self-moving device 1 is purchased. The mounting is simple, so that it is simple to implement product upgrade.

Certainly, in another embodiment, one or more elements of the insect suppression device may be alternatively shared with another component of the self-moving device 1. For example, the insect suppression device may be powered by a battery pack of the self-moving device 1 or may be controlled by the main control board of the self-moving device 1 to work, and it is only necessary to provide an electric connection and a communications connection between the insect suppression device and the main control board. The switch such as a button on an operation panel of the self-moving device 1 or an emergency stop button directly disposed on the body 3 of the self-moving device 1 may further be used to control the insect suppression device to be turned on or off. The indicator directly disposed on the body 3 of the self-moving device 1 may further be used to indicate a state of the insect suppression device. In one of the embodiments, the self-moving device 1 includes a wireless communications unit communicating with the external device. For example, the wireless communications unit communicates with the intelligent terminal of the user. The insect suppression device communicates with the external device by the wireless communications unit on the self-moving device 1. In an embodiment, the insect suppression device is integrated into the self-moving device 1, that is, the insect suppression device is mounted to the body 3 of the self-moving device 1 when the self-moving device 1 is delivered from the factory.

The insect suppression device may be mounted to a plurality of positions of the body 3 of the self-moving device 1. The positions include an upper surface or a side surface of the body 3. In an embodiment, the insect suppression device is disposed in the front of the body 3. The insect suppression device such as the insect killing electric net, the fan, the infrared heating device or the insect trap lamp may further include the insect collection device. The insect suppression device kills insects flying into the insect suppression device or captures insects on a moving path of the self-moving device 1 during movement. In an embodiment, the insect suppression device is disposed in the rear of the body 3. The insect suppression device such as a spraying device spays the insect suppression substance in an area through which the self-moving device 1 moves. In an embodiment, the insect suppression device is disposed at the top of the body 3. Specifically, the insect suppression device is disposed protruding from the body 3 and is higher than the surrounding body. Reference is made to FIG. 3. The insect suppression device is disposed at the top to facilitate the release of the insect suppression substance and the contact between the insect suppression device and insects, thereby better implementing insect suppression.

In an embodiment, the body 3 of the self-moving device 1 includes a plurality of mounting positions of the insect suppression device. The plurality of mounting positions are used for mounting one or more insect suppression devices.

Figure 6A:
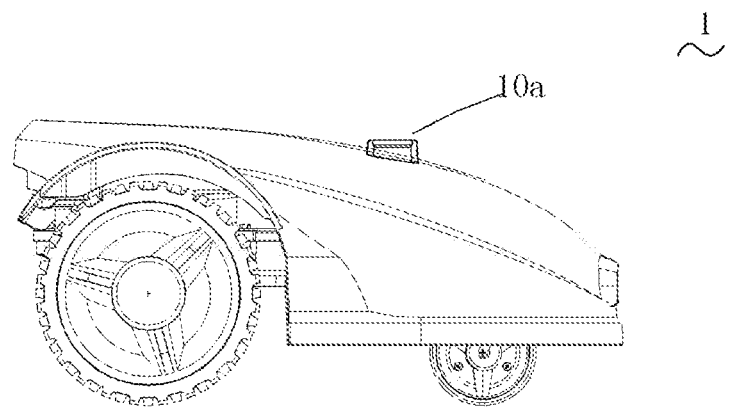
FIG. 6(a) and FIG. 6(b) are schematic diagrams of the activity of an insect suppression device according to an embodiment of the present invention.
Figure 6B:
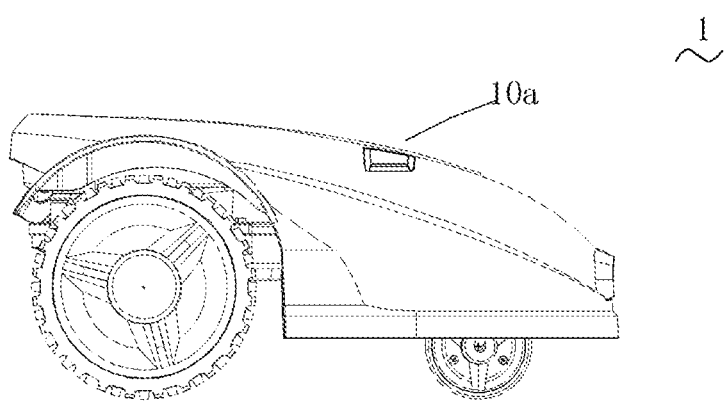
Figure 7A:
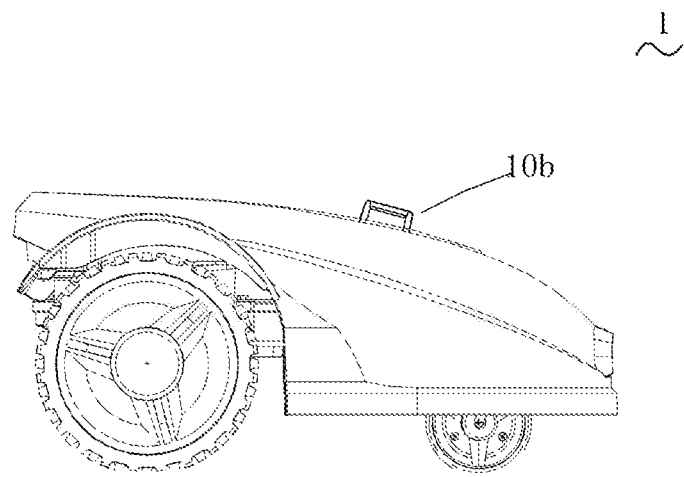
FIG. 7(a) and FIG. 7(b) are schematic diagrams of the activity of an insect suppression device according to another embodiment of the present invention.
Figure 7B:
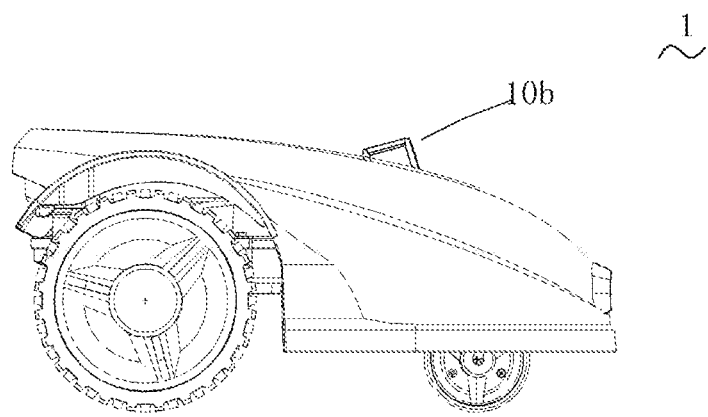

In an embodiment of the present invention, an insect suppression device 10*a* is movable relative to the body 3 of the self-moving device 1. The control module controls the insect suppression device 10*a* to switch between a first state and a second state that are relative to the body 3. Referring to FIG. 6(*a*) and FIG. 6(*b*), in an embodiment, the insect suppression device has a working state (FIG. 6(*a*)) and a non-working state (FIG. 6(*b*)). In the working state, the insect suppression device 10*a* extends from the body 3 of the self-moving device 1 to facilitate the work of the insect suppression device 10*a*. In the non-working state, the insect suppression device 10*a* retracts inward relative to the body 3, to avoid damage to the insect suppression device 10*a* caused by sunlight and rainwater and external pollutants and to prevent the protruding insect suppression device 10*a* from affecting the trafficability of the self-moving device 1 in a working condition such as short shrubs. Referring to FIG. 7(*a*) and FIG. 7(*b*), in an embodiment, an insect suppression device 10*b* includes a first working angle (FIG. 7(*a*)) and a second working angle (FIG. 7(*b*)). In the first working angle, the insect suppression device 10*b* works facing the front. In the second working angle, the insect suppression device 10*b* works facing the rear. Certainly, the insect suppression device 10*b* may further include a plurality of other working angles and may even rotate by 360 degrees to form an omnidirectional coverage area. The insect suppression device 10*b* changes the working angle to provide a wider coverage area and achieve better insect suppression. The insect suppression device (10*a*, 10*b*) moves relative to body 3, may be driven by a driving mechanism such as a motor, and may further include an adjustment structure such as a thread, a slide rail or an elastic component. The insect suppression device (10*a*, 10*b*) may rotate or translate or may rotate and translate. In this embodiment, the insect suppression device (10*a*, 10*b*) is controlled by the control module to automatically switch between states. In another embodiment, the insect suppression device (10*a*, 10*b*) may alternatively change the state by manual adjustment.

Figure 8:
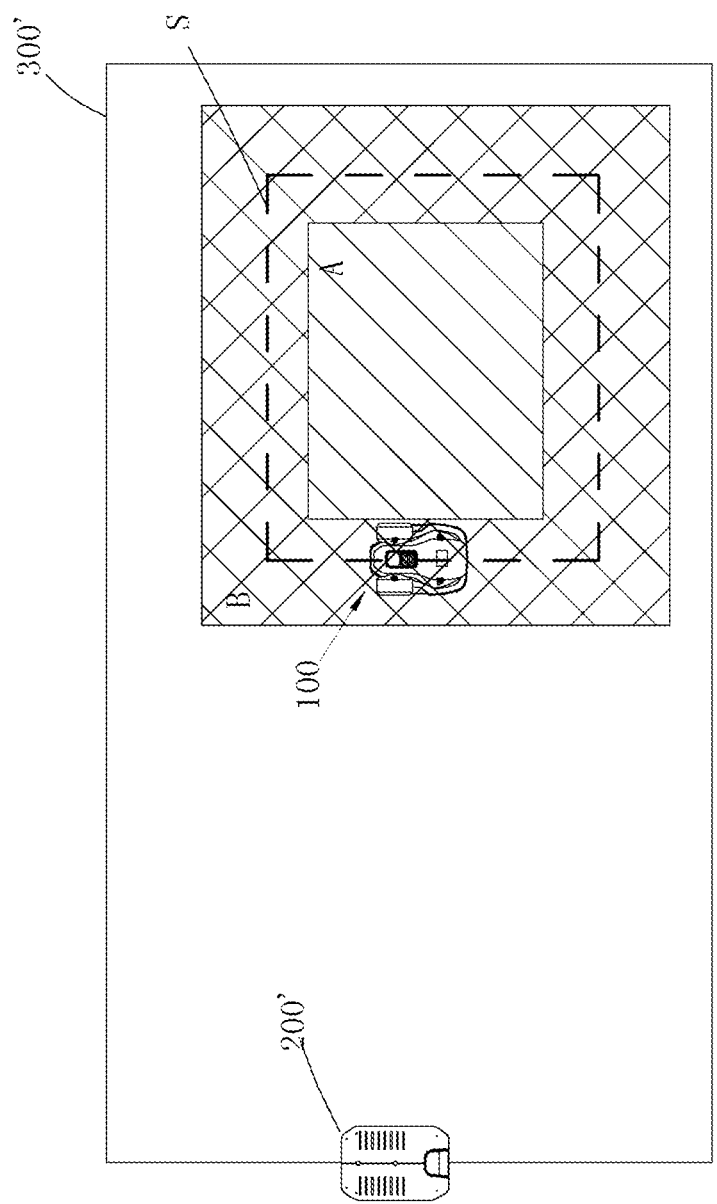
FIG. 8 is a schematic diagram of a working scenario of an autonomous lawn mower according to an embodiment of the present invention.

FIG. 8 is a schematic diagram of a working scenario of an autonomous lawn mower 100 according to an embodiment of the present invention. As shown in FIG. 8, the autonomous lawn mower 100 moves in a mowing working area 300' when performing a mowing task. An area A is a user activity area, and an area B is an insect suppression working area in which the autonomous lawn mower 100 performs an insect suppression task. Alternatively, the autonomous lawn mower 100 may move along a path S to perform the insect suppression task. The autonomous lawn mower 100 may perform the insect suppression task while moving in the area B or moving along the path S, or may select one or more working positions in the area B or on the path S, to perform the insect suppression task at a fixed point. The insect suppression area or path may be set by the user.

In this embodiment, the control module includes a storage unit storing a preset program. The preset program includes: obtaining information about a preset area or path and providing an instruction signal to drive the movement module to move in the preset area or along the preset path. The obtaining information about a preset area or path includes: obtaining an insect suppression area or path input by the user. Specifically, the user may assign the insect suppression area or path by using a mapping method. For example, the user may carry a mobile phone with an APP matching the autonomous lawn mower 100 to walk, and record position coordinates of the walking. A walking track forms a boundary of the preset area or the preset path. For another example, the user may mark an area in which a garden of the user is located, especially, the insect suppression area or path, on an APP embedded with an electronic map. The insect suppression area or path information obtained by the mobile phone APP may be received and stored by the autonomous lawn mower 100 by using the wireless communications unit. The control module provides, based on the information, an instruction signal to drive the movement module to move in the area indicated by the information or along the path indicated by the information. The autonomous lawn mower 100 includes a positioning module. The positioning module outputs current location information of the autonomous lawn mower 100, and the autonomous lawn mower 100 compares the current location information with the stored information about a preset area or path, to determine whether the autonomous lawn mower 100 is in the preset area or moves along the preset path. The positioning module includes modules such as a differential global positioning system (DGPS), a real-time kinematic (RTK) module or an ultra wide band (UWB) module.

In another embodiment, the insect suppression area or path is obtained by guiding the autonomous lawn mower 100 by the user to perform learning. Specifically, a push rod is mounted on the autonomous lawn mower 100, and the user pushes the autonomous lawn mower 100 to move. Alternatively, the user remotely controls the autonomous lawn mower 100 to move, and a moving trace forms the boundary of the preset area or the preset path. Correspondingly, the preset program includes: receiving a user instruction, driving, based on the user instruction, the movement module to move to learn about a boundary of an area or a path, and storing the boundary of the area or the path to obtain the information about a preset area or path.

In another embodiment, the positioning module of the autonomous lawn mower 100 is removed from the autonomous lawn mower 100, and is carried by the user to obtain the preset area or path.

Certainly, in the foregoing mapping process, a boundary of the user activity area may be alternatively obtained first, and the preset area or path is then calculated by the program according to a preset condition.

In another embodiment, the insect suppression working area or path may be formed by paving a guide wire. The autonomous lawn mower 100 includes a sensor detecting a guide wire signal. The control module controls, according to the signal sensed by the sensor, the autonomous lawn mower 100 to move in an area defined by the guide wire or move along a path formed by the guide wire. The guide wire may be a lead transmitting a signal such as a current signal or a radio signal, or may be a passive magnetic stripe. The guide wire may be disposed continuously or discretely or may be defined by a plurality of marks. Therefore, the obtaining information about a preset area or path also includes recognizing, by the autonomous lawn mower 100, the preset area or path according to the signal detected by the sensor.

The self-moving device 1 is controlled to perform the insect suppression work in the preset area or along the preset path, to implement planned and specified work of the insect suppression device. The self-moving device 1 generally includes a main working module configured to perform a task different from the insect suppression device. A corresponding working area is generally open. An area in which the insect suppression device is required to perform the insect suppression task may be only a small part of the working area or may even b not in the working area. Therefore, a working range of the insect suppression device can be flexibly controlled by setting an independent insect suppression working area or path, thereby improving the working efficiency of the insect suppression device, avoid energy waste, and providing the user with better services.

In some embodiments of the present invention, the user triggers to turn on or off the insect suppression device. Specifically, the user operates the independent switch on the insect suppression device, operates the switch on the body of the self-moving device or operates the intelligent terminal to remotely control the insect suppression device to be turned on or off. In some other embodiments, the insect suppression device is turned on or off automatically. The user may preset an insect suppression work program. For example, the user sets an insect suppression work schedule. Table 1 is the insect suppression work schedule in an embodiment. As shown in Table 1, from Monday to Friday, the control module turns on insect suppression device at 17:00 to work and turns off the insect suppression device at 20:00. The user may set a turn-on time and a turn-off time or may be work duration. The user may set or modify as required a time that the insect suppression device is required to work.

TABLE 1

|  | Monday | Tuesday | Wednesday | Thursday | Friday |
| --- | --- | --- | --- | --- | --- |
| Working time | 17:00 to 20:00 | 17:00 to 20:00 | 17:00 to 20:00 | 17:00 to 20:00 | 17:00 to 20:00 |

In some other embodiments, the sensor triggers the insect suppression device to be turned on or off. Specifically, the self-moving device 1 may include a sensor detecting a crowding density of insects, a sensor detecting a temperature and humidity in an environment, a sensor detecting a human activity or the like. The insect suppression device is turned on when a high crowding density of insects, a hot and damp environment or a nearby human activity is detected.

In conclusion, in some embodiments of the present invention, the control module obtains a preset signal, and controls, based on the preset signal, the insect suppression device to work and/or stop working. The preset signal may be generated by an operation of a user, may be generated by a preset program or may be triggered by a sensor. The preset program includes an insect suppression work program. The insect suppression work program provides an instruction signal to turn on and/or off the insect suppression device. The preset signal includes the instruction signal provided by the insect suppression work program. The insect suppression work program further includes: detecting a preset trigger condition, and providing, based on the detected preset trigger condition, the instruction signal to turn on and/or off the insect suppression device. The preset trigger condition may be that an instruction from the user is received, a preset work time and/or a work stop time is reached, a trigger switch or a sensor triggering the insect suppression device to work or stop working is triggered or the like.

In an embodiment, the insect suppression work schedule includes: determining whether the current time is nighttime, and turning on the insect suppression device at least based on the nighttime. Because insects usually come out and bite people during nighttime, the crowding density of insects is large during nighttime. People are more likely to suffer from the harassment of insects during activity outdoors or rest indoors during nighttime. Therefore, the insect suppression device may be turned on during nighttime to protect people from the harassment of insects. The autonomous lawn mower 100 is used as an example. The autonomous lawn mower 100 mainly performs mowing work during daytime and remains idle in the nighttime, so that the autonomous lawn mower 100 provided with an insect suppression device performs insect suppression work during nighttime, so that the same device performs different work day and night, thereby fully utilizing the device. Moreover, a cutter of the autonomous lawn mower 100 has a loud working noise. Only the insect suppression device is turned on during nighttime, so that the noise is low and does not disturb people, and therefore the product is desirable for people. The self-moving device 1 may determine whether the current time is nighttime by detecting the time with a clock or detecting illuminance by an illuminance sensor, and determine to turn on the insect suppression device when the current time is nighttime.

In an embodiment, the insect suppression work schedule includes: determining whether there is a user activity in or near the working area, and turning on the insect suppression device at least based on the user activity in or near the working area. The insect suppression device is enabled to work when there is a user activity in or near the working area, so that the insect suppression device directly protects people from the harassment of insects. The autonomous lawn mower 100 is used as an example. Referring to FIG. 8, the autonomous lawn mower 100 determines whether there is a user activity in the area A. If it is determined that there is a user activity in the area A, the insect suppression task is performed in the periphery of a user activity area (in the area B or on the path S), to keep insects outside the user activity area without affecting the user activity. Certainly, the autonomous lawn mower 100 may also enter the user activity area when performing the insect suppression task, to implement better insect suppression. When the autonomous lawn mower 100 performs the insect suppression task, the cutter does not work, thereby preventing the cutter from touching and injuring the human body. In another embodiment, alternatively, the main working module and the insect suppression device of the self-moving device 1 may work at the same time, thereby improving the working efficiency of the self-moving device 1. The self-moving device 1 may include an infrared sensor recognizing whether there is a human activity nearby, to determine whether to turn on the insect suppression device. The self-moving device 1 may further sense a device carried by the user to determine a distance from the user. When the user is at a preset distance, the insect suppression device is turned on to work.

In an embodiment, the foregoing preset program includes: determining a current season, and arranging or adjusting the work schedule according to the current season. According to the density of insects in different seasons, the working frequency or duration of the insect suppression device may be arranged or adjusted according to whether it is a high season for breeding of insects. Different seasons have different night time, so that the time of turning on the insect suppression device may be arranged or adjusted according to different seasons. The self-moving device 1 may determine the current season with a clock, or may obtain current season information by the wireless communications unit.

In an embodiment, the preset program includes: obtaining weather information including a weather forecast, and arranging or adjusting the work schedule according to the weather information. The weather information includes temperature and humidity information. The breeding and density of insects may be determined according to the temperature and humidity information, so as to arrange or adjust the working efficiency or duration of the insect suppression device. The weather information further includes information about rainfall, wind or the like. According to the information about rainfall or wind, a probability that insects appear may be determined or a probability that there is a user activity in or near the working area may be determined, so as to arrange or adjust the insect suppression work schedule. The weather information may be current or future information or information in a past period of time. By collecting weather information in the past period of time, the current breeding and density of insects may be determined. The self-moving device 1 may obtain the weather information by using the wireless communications unit, for example, from a cloud, and the work schedule may also be arranged or adjusted at the cloud. Certainly, the self-moving device 1 may alternatively obtain weather information by using a local sensor such as a rain sensor, and an illuminance sensor.

The method for arranging or adjusting a work schedule facilitates more flexible and effective work of the insect suppression device.

In an embodiment of the present invention, the insect suppression device includes at least two working levels, and the control module adjusts a working strength of the insect suppression device based on the preset signal. Specifically, the preset signal may be from the user, and the user operates buttons of different working levels to implement different working strengths of the insect suppression device. The operation of a user may be a local operation or may be a remote operation. The preset signal may be alternatively triggered by a program. For example, the program may be set to work with a first strength in a first working period at intervals and work with a second strength in a second working period. Alternatively, the working strength of the insect suppression device may be increased when the sensor detects a high density of insects or frequent user activities. The working strength of the insect suppression device may be represented by a release of the insect suppression substance, a temperature of the heating device or the like. Different working levels are set to facilitate the flexible adjustment of the working strength of the insect suppression device and provide the user with more choices.

In another embodiment of the present invention, an insect suppression device is an accessory of an automatic working system, and can be also mounted to charging stations (200, 200') of a self-moving device. Referring to FIG. 9, the charging station 200 includes the insect suppression device 10. The self-moving device 1 includes a first control device, and the charging station 200 includes a second control device. In an embodiment, the second control device of the charging station 200 controls the work of the insect suppression device 10. In another embodiment, the self-moving device 1 establishes a communications connection with the charging station 200, and the first control device of the self-moving device 1 controls the work of the insect suppression device 10. The communications connection between the self-moving device 1 and the charging station 200 may be a wired connection. For example, when the self-moving device 1 is docked with the charging station 200, the wired connection is established between the self-moving device 1 and a charging terminal of the charging station 200 The communications connection between the self-moving device 1 and the charging station 200 may be a wireless connection. For example, the wireless connection is established between wireless communications units of the self-moving device 1 and the charging station 200, so that the control device of the self-moving device 1 may be fully utilized. A docking interface of the insect suppression device is mounted to the charging station 200. A specification of the interface is the same as that of a docking interface on the self-moving device, so that the insect suppression device 10 may be selectively connected to the self-moving device 1 or the charging station 200. The user may purchase a plurality of insect suppression devices 10 and separately mount the plurality of insect suppression devices 10 in the self-moving device 1 or the charging station 200 to improve insect suppression. The charging station 200 has an energy supply module, and the insect suppression device 10 is attached to the charging station 200, which is a desirable mounting position, especially in an application to an outdoor system.

The control device may be a digital signal processor (DSP), a microprocessor unit (MPU), an application specific integrated circuit (ASIC), a programmable logic device (PLD), a system on chip (SOC), a central processing unit (CPU) or a field programmable gate array (FPGA). It may be understood that the embodiments of the present invention are not limited to a specific type of the control device.

The present invention is not limited to the specific embodiments listed, and the structures and the methods based on the concept of the present invention shall fall within the protection scope of the present invention.

What is claimed is:

1. A self-moving device, moving in a working area and performing a working task, the self-moving device comprising:
 a body;
 a wheel set, mounted on the body, and driving the self-moving device to move,
 an insect suppression device, mounted to the body; and
 a control module, controlling the wheel set to move, and controlling the insect suppression device to work,
 wherein the control module obtains a preset signal, and controls, according to the preset signal, the insect suppression device, and
 wherein the control module comprises a storage unit that stores a preset program, the preset program comprising:
  an insect suppression work program, comprising:
   a work schedule, comprising a work start time or a work end time;
   providing, according to the work start time, an instruction signal to turn on the insect suppression device, or
   providing, according to the work end time, the instruction signal to turn off the insect suppression device,
 wherein the control module executes the preset program, and the preset signal comprises the instruction signal.

2. The self-moving device according to claim 1, wherein the preset program further comprises:
 determining a current season, and arranging or adjusting the work schedule according to the current season, or
 wherein the preset program further comprises:
  obtaining weather information, and arranging or adjusting the work schedule according to the weather information, or the work schedule comprises:
   determining whether the current time is nighttime, and starting the insect suppression device during nighttime, or
  the work schedule comprises:
   determining whether there is a user activity in or near the working area, and
   starting the insect suppression device if there is a user activity in or near the working area.

3. The self-moving device according to claim 1, wherein the insect suppression device comprises at least two working strength levels, and the control module adjusts a working strength of the insect suppression device based on the preset signal.

4. The self-moving device according to claim 1, further comprising:
 a cutting module, a cleaning module, a polishing module, or a sweeping module configured to perform a task different from that of the insect suppression device.

5. The self-moving device according to claim 1, wherein the self-moving device comprises an autonomous lawn mower, and the autonomous lawn mower comprises a cutting module controlled by the control module to perform a mowing task.

6. The self-moving device according to claim 1, wherein the wheel set is driven by a motor and includes a track disposed around the wheel set.

7. The self-moving device according to claim 1, wherein the insect suppression device is detachably connected to the body.

8. The self-moving device according to claim 1, wherein the insect suppression device comprises at least one of an independent power supply, an independent controller, an independent switch or an independent indicator.

9. The self-moving device according to claim 1, wherein the insect suppression device is arranged at the front or rear of the body and/or the insect suppression device is arranged at the top of the body.

10. The self-moving device according to claim 1, wherein the insect suppression device is movable relative to the body, and the control module controls the insect suppression device to switch between a first state and a second state that are relative to the body.

11. The self-moving device according to claim 1, wherein the insect suppression device comprises an insect repelling device or an insect killing device.

12. The self-moving device according to claim 1, wherein the insect suppression device comprises an insect trap module and an insect killing module, and the insect trap module and the insect killing module are integrated or the insect trap module and the insect killing module are separately disposed.

13. The self-moving device according to claim 1, wherein when the control module controls the insect suppression device to work, it controls the self-moving device to move in a preset area or along a preset path.

14. A self-moving device, moving in a working area and performing a working task, the self-moving device comprising:
 a body;
 a wheel set, mounted on the body, and driving the self-moving device to move;
 an insect suppression device, mounted to the body;
 a control module, controlling the wheel set to move, and controlling the insect suppression device to work,
 wherein the control module obtains a preset signal, and controls, according to the preset signal, the insect suppression device to work or stop working; and
 a wireless communications unit,
 wherein the control module obtains the preset signal by the wireless communications unit or the preset signal is triggered by an operation of a user.

15. The self-moving device according to claim 14, wherein the control module comprises a storage unit that stores a preset program, and the preset program comprises:
 an insect suppression work program, comprising:
  providing an instruction signal to turn on the insect suppression device or turn off the insect suppression device, wherein
 the control module executes the preset program, and the preset signal comprises the instruction signal.

16. The self-moving device according to claim 14, wherein the wheel set is driven by a motor and includes a track disposed around the wheel set.

17. A self-moving device, moving in a working area and performing a working task, the self-moving device comprising:
 a body;
 a wheel set, mounted on the body, and driving the self-moving device to move,
 an insect suppression device, mounted to the body; and
 a control module, controlling the wheel set to move, and controlling the insect suppression device to work, wherein the control module obtains a preset signal, and controls, according to the preset signal, the insect suppression device, wherein the control module comprises a storage unit that stores a preset program, the preset program comprising:
an insect suppression work program, comprising:
detecting a preset trigger condition, and providing, based on the detected preset trigger condition, the instruction signal to turn on the insect suppression device or turn off the insect suppression device,
wherein the control module executes the preset program, and the preset signal comprises the instruction signal.

18. The self-moving device according to claim 17, wherein the wheel set is driven by a motor and includes a track disposed around the wheel set.

* * * * *